United States Patent

[11] 3,611,108

| [72] | Inventors | Tadakuma Susumu<br>Yokohama;<br>Tanaka Shigeru, Kamakura; Kuniyoshi Masateru, Yokohama; Inagaki Junpei, Yokohama, all of Japan |
|---|---|---|
| [21] | Appl. No. | 88,293 |
| [22] | Filed | Nov. 10, 1970 |
| [45] | Patented | Oct. 5, 1971 |
| [73] | Assignee | Tokyo Shibaura Electric Co., Ltd.<br>Kawasaki-shi, Japan |
| [32] | Priority | Nov. 10, 1969, June 8, 1970 |
| [33] | | Japan |
| [31] | | 44/89634 and 45/48911 |

[54] SYSTEM FOR DETECTING AND GENERATING AN OUTPUT INDICATIVE OF A SIMULTANEOUS CONDITION OF THE SERIALLY CONNECTED THYRISTORS
10 Claims, 9 Drawing Figs.

[52] U.S. Cl. .................................................. 321/11, 321/5, 321/18
[51] Int. Cl. .................................................. H02m 1/18
[50] Field of Search ........................................... 321/5, 11–14, 18, 21

[56] References Cited
UNITED STATES PATENTS

| 3,394,299 | 7/1968 | Lawn et al. ................... | 321/11 |
| 3,423,665 | 1/1969 | Greenberg et al. ........... | 321/11 |

*Primary Examiner*—William M. Shoop, Jr.
*Attorney*—Oblon, Fisher & Spivak

ABSTRACT: An inverter device is disclosed which has at least two thyristors which are serially connected in one arm of a bridge across a DC voltage supply. A device is provided for detecting and generating an output indicative of a simultaneous conduction of the serially connected thyristors. The output from the detecting device is added to an input control device for the inverter so as to interrupt the DC input applied thereto for a desired time interval. The input control device for the inverter also functions to automatically restart the operation of the inverter by again connecting the DC voltage supply to the input of the inverter at the end of the aforesaid time interval.

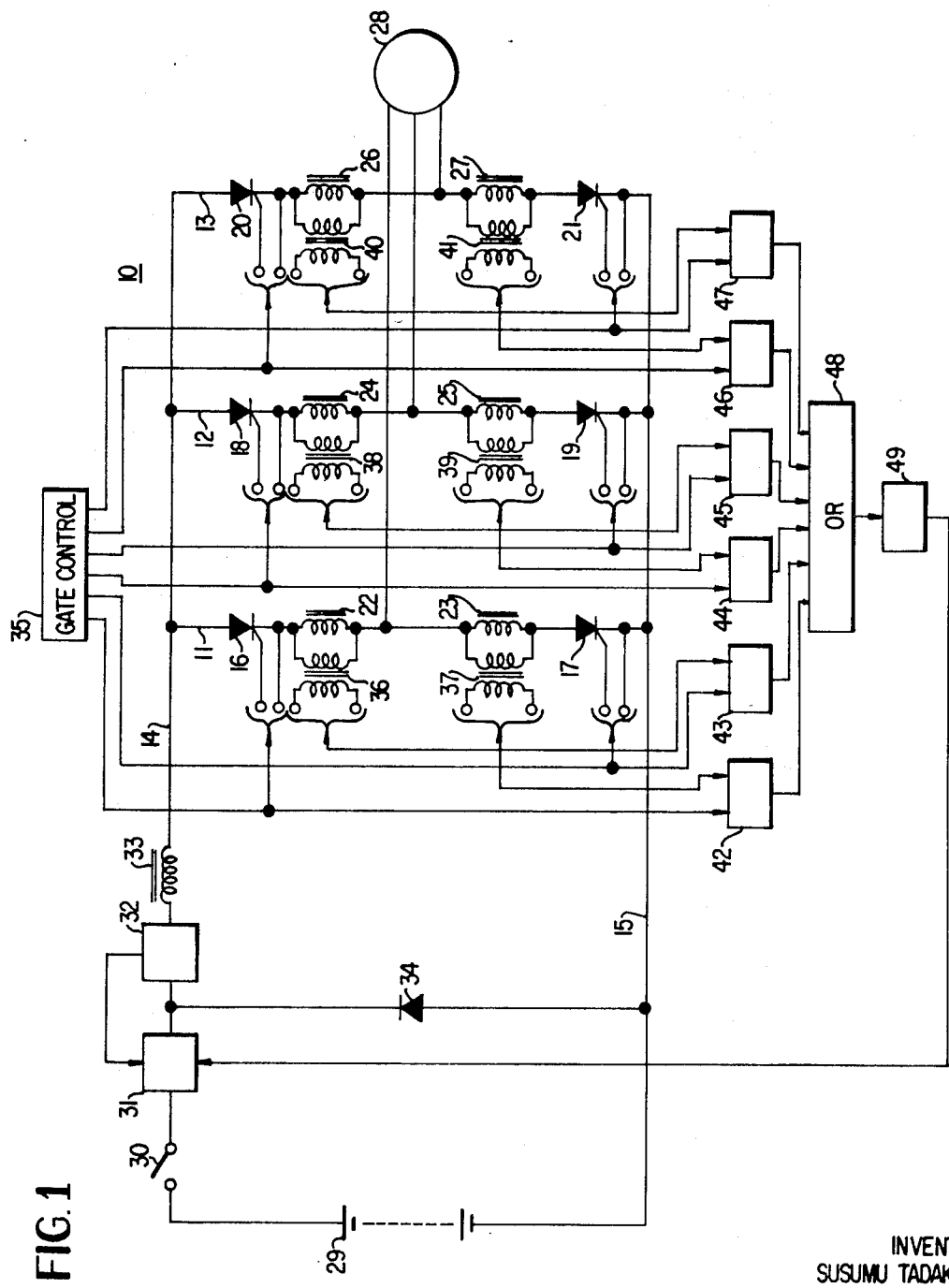

3,611,108

SYSTEM FOR DETECTING AND GENERATING AN OUTPUT INDICATIVE OF A SIMULTANEOUS CONDITION OF THE SERIALLY CONNECTED THYRISTORS

BACKGROUND OF THE INVENTION

1. Field of the Invention

The present invention relates to a control system for a thyristor inverter device which will cause the operation of the thyristor inverter to automatically stop when a failure of commutation occurs, and which will cause the operation of the thyristor inverter to automatically restart after the thyristors therein have turned off.

2. Description of the Prior Art

In the past, thyristor inverters have generally included at least one bridge arm which was connected across a DC voltage supply and had a pair of thyristors serially connected therein. An electrical load to be energized was connected between a point interconnecting the serially connected thyristors and an electrical neutral point.

In a typical operation of the inverter, the thyristors were sequentially turned on in order to enable an AC output voltage to be supplied to the load. While generally satisfactory, occasionally a failure of commutation would occur in the thyristor inverter due to a sudden increase in the load current and a high surge of voltage which would be introduced through an external powerline. When such a failure of commutation would occur, the serially connected thyristors in the bridge arm would simultaneously become conductive which would, in turn, cause a short circuit across the DC voltage supply.

Such a short circuit often caused a burnout of the thyristors, severe damage to other apparatus within the inverter circuit, as well as interruption of the electric power being supplied to the load. In the past, it has been difficult to prevent a failure of commutation from occurring in a thyristor inverter, especially when the same was operated under heavy load conditions.

SUMMARY OF THE INVENTION

Accordingly, it is one object of this invention to provide a new and improved unique control system for an inverter which is capable of quickly removing any failure of commutation of the inverter and of automatically restarting the inverter upon such removal for enabling reenergization of the load thereof.

Another object of the invention is to provide a new and improved unique control system for an inverter in which the simultaneous conduction of thyristors serially connected in a bridge arm can be quickly and automatically detected whereby it is possible to prevent the thyristors and other apparatus provided within the inverter circuit from being damaged.

Briefly, in accordance with this invention, these and other objects are, in one aspect, attained by the provision of a three-phase bridge inverter having three arms which are connected in a parallel relationship. Each of the arms of the bridge inverter includes a pair of serially connected thyristors therein. An intermediate connecting point between the pair of thyristors of each of the respective arms is connected to a three-phase load such, for example, as an electric motor. A chopper is provided for supplying a regulated DC input voltage to the inverter. A gate control is provided for supplying gating signals or pulses to corresponding gates of the thyristors in accordance with a predetermined sequence. A reactor is provided and connected in series with the thyristors of each of the respective arms, and a pulse transformer is respectively connected across each of the reactors for providing an electrical pulse corresponding to the current flowing through a respective adjacent thyristor. A pair of AND gates is coupled to each arm such that one of the AND gates is supplied with a gating pulse from one of the thyristors in that arm and an electrical signal which corresponds to the current flowing through the other thyristor in the arm. An OR gate is provided for receiving the output signals from the AND gates. A timing circuit is also provided and connected to the OR gate such that when a signal is received from the OR gate the operation of the chopper will stop and thereby effect an interruption of the DC input to the inverter for a predetermined time interval after which time the same will restart.

BRIEF DESCRIPTION OF THE DRAWINGS

The present invention will be more fully understood from the following description when taken in connection with reference to the accompanying drawings, wherein:

FIG. 1 is a circuit diagram of a preferred embodiment in accordance with the present invention;

DETAILED DESCRIPTION OF THE PREFERRED EMBODIMENTS

Figure 3:
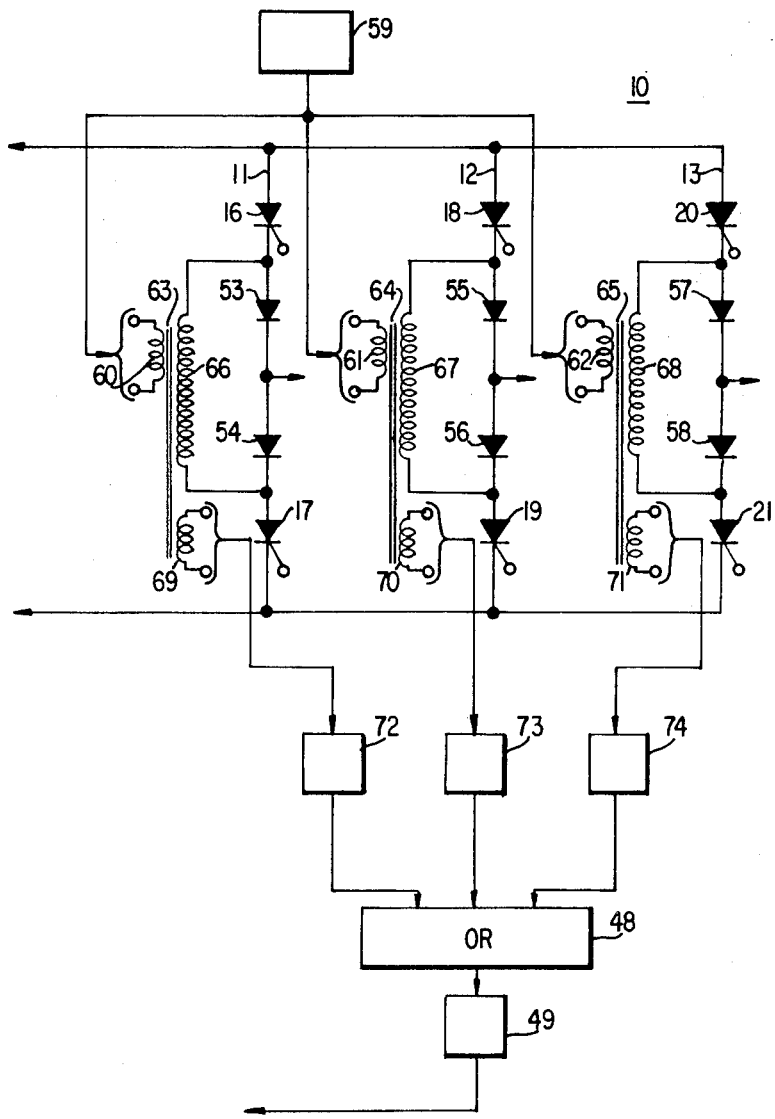
FIG. 3 is a circuit diagram, partly broken away, of another preferred embodiment of the present invention.

Referring now to the drawings, wherein like reference numerals designate identical or corresponding parts throughout the several views, and more particularly to FIG. 1, wherein an inverter 10 is shown as including three arms 11, 12, and 13 which are connected in parallel between a pair of DC voltage lines 14 and 15. Each of the arms 11, 12 and 13, respectively, includes a pair of serially connected thyristors 16, 17, 18, 19 and 20, 21 and a pair of reactors 22, 23, 24, 25, and 26, 27. The pairs of reactors are, as shown, respectively connected in series between the pair of thyristors. An intermediate connecting point between each of the respective pair of reactors is connected to an electrical load 28 such, for example, as an electric motor.

In order to supply a DC input voltage to the inverter 10, one of the pair of DC voltage lines, such as line 14, is connected through a serially connected circuit to the positive terminal of DC voltage supply 29, which may be, for example, a battery or rectifier device. The serially connected circuit is shown as including a main switch 30, a thyristor chopper device 31, a DC current transformer 32, and a smoothing reactor 33. It should be understood that the DC current transformer 32 is for controlling the chopper 31 so as to prevent an excessive current condition from occurring within the inverter. The other DC voltage line 15 is directly connected to the negative terminal of the DC voltage supply 29.

A diode 34, the purpose of which will be hereinafter explained, is connected in a polarity as shown between the input terminal of the DC current transformer 32 and the negative voltage line 15.

In order to supply turn-on gating pulses to the gates of the thyristors 16 to 21 of the inverter 10 in a predetermined sequence, a conventional gate control device 35 is provided.

Pulse transformers 36 to 41 are provided and are respectively connected, as shown, across the reactors 22 to 27 in order to provide a signal responsive to the current flowing through the corresponding thyristors as obtained from the respective reactor terminals.

Additionally, six AND gates 42 to 47 are provided for detecting the simultaneous conduction of the two thyristors serially connected in the respective arms 11, 12 and 13. It should be understood that the first pair of AND gates 42 and 43 are coupled to the first arm 11, the second pair of AND gates 44 and 45 are coupled to the second arm 12, and the third pair of AND gates 46 and 47 are coupled to the third arm 13.

The AND gate 42 is arranged to receive a gating signal which corresponds to that of the thyristor 16 and a signal obtained from the pulse transformer 37. The AND gate 43 is arranged to receive a gating signal which corresponds to that of the thyristor 17 and a signal obtained from the pulse transformer 22. The other pairs of AND gates 44, 45 and 46, 47 are similarly arranged with respect to the like components of the arms 12 and 13. The outputs from all of the AND gates 42 to 47 are applied to the input of an OR gate 48. The output from the OR gate 48 is then applied to a timing circuit device 49, which may be, for example, a monostable multivibrator. The timing circuit 49 will function to cause the chopper 31 to stop its operation for a predetermined time interval, the same being defined by the time constant of the timing circuit device 49.

Under normal operating conditions, the six thyristors 16 to 21 of the inverter will be sequentially turned on and off in a conventional manner, and the serially connected thyristors in the respective arms 11, 12 and 13 will not simultaneously conduct. Accordingly, none of the AND gates 42 to 47 will simultaneously receive two signals at the inputs thereof and, as such, none of the AND gates 42 to 47 will generate an output therefrom. In view of the above, no signal will be received by the OR gate 48, and in turn, no signal will be received by the timing circuit 47 so that operation of chopper 31 will not be stopped.

Figure 2:
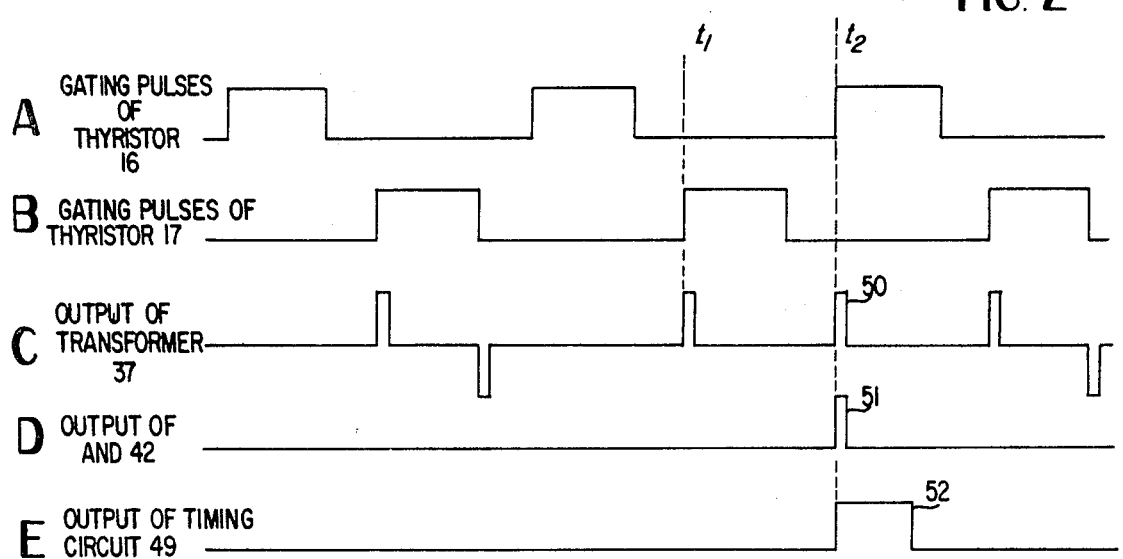
FIGS. 2a, 2b, 2c, 2d, and 2e show various waveforms for illustrating the operation of the circuit of FIG. 1.

FIGS. 2a and 2b respectively show typical gating signals applied from the gate control 35 to the thyristors 16 and 17 of the arm 11 in FIG. 1. FIG. 2c shows typical output pulses obtained from the pulse transformer 37 in the same arm 11. If it is assumed that a failure of commutation has occurred after the time $t_1$, it is apparent that the thyristor 17 will not be properly turned off. As such, when the gating signal, as shown in FIG. 2a, is applied to the gate of the thyristor 16 at the time $t_2$, then both of the thyristors 16 and 17 which are in the arm 11 will simultaneously become conductive and, in turn, will cause a short circuit to occur across the DC power supply 29.

With the present invention, when such conditions occur, the AND gate 42 will simultaneously receive the gating pulse of thyristor 16 and the pulse 50 obtained from the transformer 37, so as to generate the output pulse 51, as shown in FIG. 2d, which is then applied to the OR gate 48.

Upon receipt of the pulse 51 by the OR gate 48, the same will generate an output signal for triggering the timing circuit 49. When so triggered, the timing circuit 49 will provide the output signal 52 for a predetermined period of time, such as shown in FIG. 2e. During the period of time that the output signal from the timing circuit 49 is present, the operation of the chopper 31 will cease and thereby effect interruption of the operation of the inverter 10 by preventing a signal from the DC voltage supply 29 from being applied thereto.

It should be understood that when the inverter 10 is prevented from receiving a signal from the DC voltage supply 29 that the electromagnetic energy which has been accumulated in the smoothing reactor 33 and the reactors 22 to 27 will be discharged through a circuit which serially includes the diode 34, the smoothing reactor 33 and the bridge inverter 10. The discharge of the electromagnetic energy or current will take place gradually in accordance with the time constant of the just-described serial circuit. Now, when the current discharged reaches an amplitude which is lower than that of the holding current of the thyristors employed, all of the thyristors provided within the inverter 10 will be turned off and thereby remove the failure of commutation. It should be further understood that the timing circuit 49 is designed so as to continue to provide the output 52 therefrom until all of the thyristors provided within the inverter 10 have been turned off. The chopper 31 will automatically be restarted when the output signal 52 obtained from the timing circuit 49 is no longer present such that the inverter 10 will again be energized by the DC voltage supply 29.

Referring now to FIG. 3, another embodiment of the present invention is shown as including a pair of serially connected diodes 53, 54, 55, 56 and 57, 58, in each of the respective arms 11, 12, and 13 instead of the reactors 22 to 27 of FIG. 1. It should be understood that the intermediate connecting points between each of the aforesaid pairs of diodes are connected to an electrical load (not shown). An electrical pulse generator 59 is provided for energization of primary windings 60, 61 and 62 of pulse transformers 63, 64 and 65. Secondary windings 66, 67 and 68 of the pulse transformers 63, 64 and 65 are respectively connected as shown across the pairs of diodes 53, 54, 55, 56 and 57, 58. Each of the transformers 63, 64, and 65 include a respective tertiary winding 69, 70 and 71 for obtaining an output pulse therefrom.

Under normal operating conditions for the inverter 10, a failure of commutation will not occur and the pairs of diodes 53, 54, 55, 56 and 57, 58 will not simultaneously conduct. Under such conditions, the output pulses can be obtained from the respective tertiary windings 69, 70 and 71 of the transformers 63, 64 and 65.

However, it should be apparent that upon a failure of commutation, the serially connected thyristors 16 and 17 in, for example, the arm 11, will simultaneously conduct. At such time, the DC input to the inverter 10 will be short circuited through the arm 11.

Additionally, when the diodes 53 and 54 simultaneously conduct, the secondary winding 66 of the transformer 63 will be short circuited, such that the output pulses from the tertiary winding 69 will either be entirely eliminated or reduced to an extremely low level.

Any output pulses appearing at the tertiary windings 69, 70 and 71 will be separately applied to respective level detectors 72, 73 and 74 which may be, for example, a Schmitt trigger circuit. The level detectors 72, 73 and 74 will function to generate an output therefrom only when the amplitude of the input thereto is smaller than a predetermined level. In the above example, where only the diodes 53 and 54 will simultaneously conduct, only the level detector 72 will generate an output therefrom.

Any output from the level detectors are applied to an OR gate 48, the output of which is further applied to the chopper 31, as shown in FIG. 1, through the monostable multivibrator timing circuit 49. Thus, upon receipt of a signal from any of the level detectors, the monostable multivibrator 49 will generate an output therefrom which will interrupt the DC input to the inverter 10 for a predetermined time interval.

Figure 4:
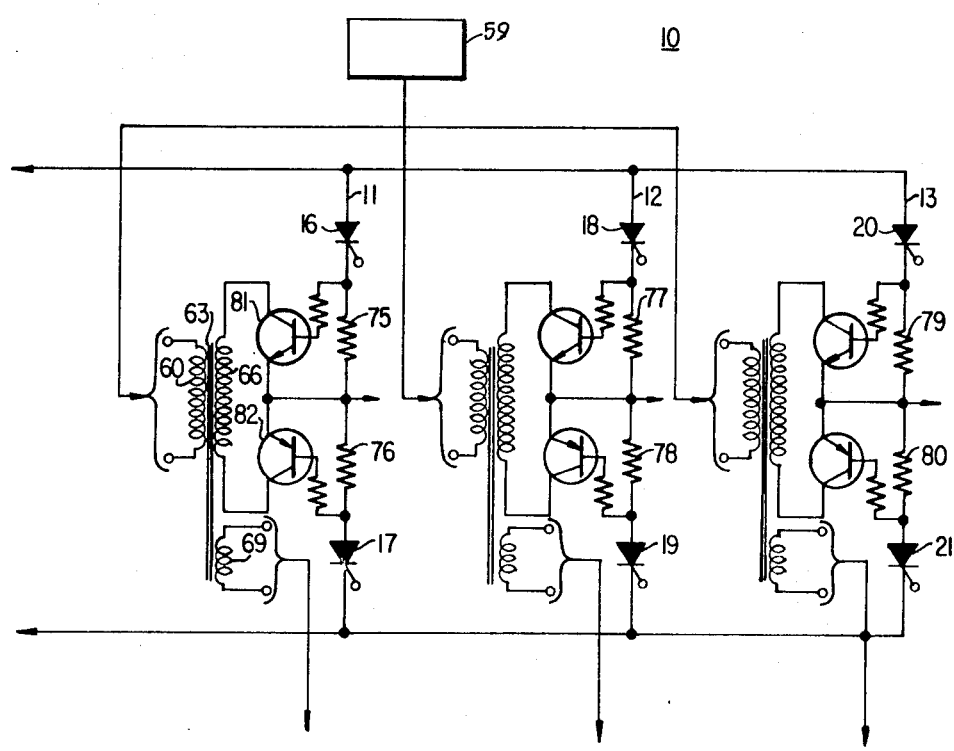
FIG. 4 shows a circuit diagram of still another alternative and preferred embodiment of the present invention; and, FIG. 5 shows a block circuit diagram of still one further alternative and preferred embodiment of the present invention.

In accordance with still another embodiment which is shown in FIG. 4, a pair of serially connected resistors 75, 76, 77, 78 and 79, 80 are respectively provided in the respective arms 11, 12 and 13 instead of the diodes of FIG. 3.

Referring, for example, to the first arm 11, a pair of transistors 81 and 82 are provides for the simultaneous conduction of the serially connected thyristors 16 and 17. The transistor 81 may be of the NPN type and the base thereof is connected to the upper terminal of the resistor 75. The emitter of the transistor is connected to a point between the two resistors 75 and 76. The transistor 82 may be of the PNP type and the base thereof is connected to the lower terminal of the resistor 76. The emitter of the transistor 82 is connected to the same connecting point between the two resistors 75 and 76.

A secondary winding 66 of the pulse transformer 63 is connected between the collectors of both of the transistors 81 and 82, and electrical pulses are supplied from the pulse generator 59 to the primary winding 60 of the transformer 63.

Under a normal operation of the inverter 10, the two thyristors 16 and 17 provided in the arm 11 will not simultaneously conduct and as such, the transistors 81 and 82 will likewise not simultaneously conduct. Under such conditions, the pulses applied to the transformer 63 from the generator 59 will be obtained at the tertiary winding 69.

However, where a simultaneous conduction of the thyristors 16 and 17 occurs, the transistors 81 and 82 will also simultaneously conduct due to the voltage drop which will appear across the resistors 75 and 76. Under such conditions, the secondary winding 66 of the transformer 63 will be short circuited through the collector circuit of both of the transistors 81 and 82 and as a result thereof, no output pulses will be obtained at the tertiary winding 69.

In accordance with the above, it should be understood that it is possible to remove the short circuit condition in the arm 11 by utilization of a logic circuit similar to that of FIG. 3.

It should also be apparent that components are provided in the second and third arms 12 and 13 for enabling the short circuit condition to be eliminated in a similar manner to that of the described arm 11.

Figure 5:
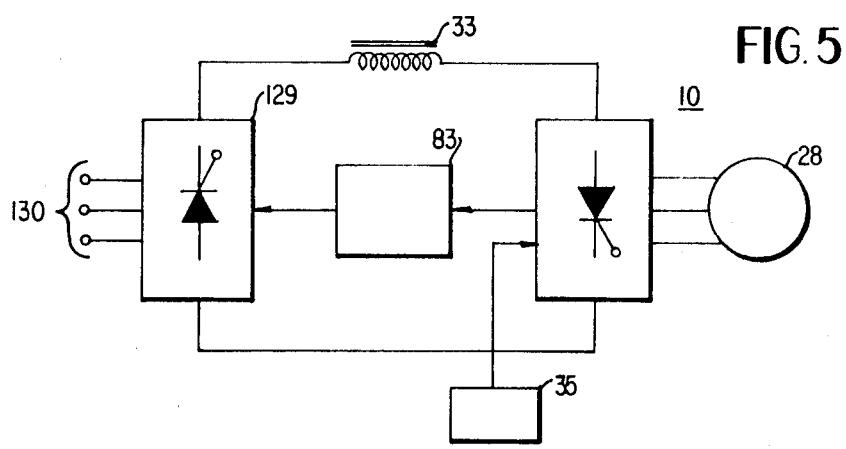

In FIG. 5, one other embodiment of the present invention is shown as including a silicon controlled rectifier 129 having a gate control device which is employed for enabling an adjustable DC voltage to be applied to the inverter 10. A logic circuit 83 similar to that of FIGS. 1 or 3 is provided for connecting the rectifier 129 to the inverter 10 upon the occurrence of a failure of commutation therein.

With such an arrangement, it should be understood that the current, which results from the electromagnetic energy stored in the smoothing reactor 33, is returned to the AC voltage source 130 through the rectifier 129 which has been connected to the inverter. When the rectifier 129 is so connected to the inverter, it will function as an impedance against the aforesaid current, and accordingly will rapidly reduce the same to an amplitude lower than that of the holding current of the thyristors in the inverter 10, whereby the inverter 10 can be started at the earlier time.

It should now be apparent that in accordance with the present invention, the simultaneous conduction of thyristors which are connected in a series relationship in an arm of the inverter can be accurately detected, thus enabling the failure of commutation of the inverter to be rapidly removed and automatically restarted after turnoff of the thyristors provided therein.

Obviously, may modifications and variations of the present invention are possible in the light of the above teachings. Thus, for example, the transformers and reactors of FIG. 1 used for detecting the simultaneous conduction of the thyristors in a particular arm could be readily replaced with serially connected current transformers and the like. It is therefore to be understood, that within the scope of the teachings herein and the appended claims, the invention may be practiced otherwise than as specifically described.

What is claimed as new and desired to be secured by Letters Patent of the United States is:

1. A control system for inverter comprising:
    an inverter having at least one arm which is energized from a DC voltage supply and which includes at least two thyristors serially connected therein with an intermediate point therebetween being connected to an AC load device for energization thereof;
    a device for detecting the simultaneous conduction of said thyristors in said at least one arm and for providing output indicative thereof; and,
    means for interrupting the DC energization of said inverter for a predetermined time interval in response to the output from said detecting device and for automatically restarting said inverter after turnoff of said thyristors.

2. A control device for an inverter according claim 1, wherein:
    said device for detecting the simultaneous conduction of said thyristors includes transformers respectively coupled with corresponding thyristors for providing an indication of the current flowing therethrough.

3. A control system for an inverter according to claim 1, wherein:
    said device for detecting the simultaneous conduction of said thyristors comprises:
    a pair of diodes serially connected between said thyristors in a polarity so as to enable any thyristor current to flow therethrough, and,
    a pulse transformer means having a primary winding to be energized from an electrical pulse generator, a secondary winding connected across said serially connected diodes and a tertiary winding for obtaining said output therefrom.

4. A control system for an inverter according to claim 1, wherein:
    said device for detecting the simultaneous conduction of said thyristors comprises:
    a pair of voltage dropping elements serially connected between said thyristors,
    a pair of transistors, the bases and emitters of which are respectively connected across a corresponding one of said voltage dropping elements, and,
    a transformer means having a primary winding to be energized from an electrical pulse generator, a secondary winding connected across the collectors of said transistors and a tertiary winding for obtaining said output therefrom.

5. A control system for an inverter according to claim 1, wherein:
    said means responsive to the output from said detecting device comprises:
    at least two AND gates, one of which is capable of receiving a gating signal from one of said thyristors and a signal responsive to the current flowing through the other of said thyristors, and the other of which is capable of receiving a gating signal from the other of said thyristors and a signal responsive to the current flowing through said one of said thyristors, any said of said AND gates generating an output therefrom in response to the simultaneous presence of both of the signals applied thereto,
    an OR gate connected to the output of the AND gates, and
    a timing circuit device connected to said OR gate for receiving an output therefrom, said timing circuit device functioning to interrupt the DC energization of said inverter for a predetermined time interval, and for automatically restarting the inverter after said time interval has passed.

6. A control system for an inverter according to claim 1, wherein:
    said means responsive to the output from said detecting device comprises:
    a level detector device which is responsive to the absence of said output from said detecting device and for generating an output indicative thereof, and,
    a timing circuit device for receiving the output of the level detector device for interrupting the DC energization of said inverter for a predetermined time interval and for restarting the inverter at the end of the time interval.

7. A control system for an inverter according to claim 1, wherein:
    said means responsive to the output from said detecting device comprises:
    a level detector device which is responsive to a predetermined reduction in the output level of said output from said detecting device, and,
    a timing circuit device for receiving the output of the level detector device for interrupting the DC energization of said inverter for a predetermined time interval and for restarting the inverter at the end of the time interval.

8. A control system for an inverter according to claim 1, wherein:
    said inverter is energized from said DC voltage source through a chopper device, and wherein the chopper device is deenergized when it is intended that the inverter stop its operation.

9. A control system for an inverter according to claim 8, wherein:
    a diode device and a smoothing reactor is provided;
    said smoothing reactor and said inverter being serially connected with said diode device thereacross such that electromagnetic energy stored in the reactor and the inverter circuit is gradually discharged through the diode device.

10. A control system for inverter according to claim 1, wherein:

the energization of said inverter is controlled by a controllable rectifier upon connection to said inverter, said rectifier functioning as an impedance for rapidly reducing the amplitude of the current to be returned to an AC power supply for the rectifier when the same is connected to said inverter.